2,881,194

POLYAMIDE RESIN PROCESS AND PRODUCT

Dwight E. Peerman, Minneapolis, and Don E. Floyd, Robbinsdale, Minn., assignors to General Mills, Inc., a corporation of Delaware No Drawing. Application October 11, 1955
Serial No. 539,923

2 Claims. (Cl. 260—404.5)

The present invention relates to a novel polyamide resin product and to a process of producing the same. The polyamide resin is particularly useful for reaction with epoxy resins to obtain products of novel and useful properties.

In U.S. patent to Renfrew et al. 2,705,223, there is disclosed the use of certain polyamide resins for reaction with epoxy resins to produce cured resinous compositions of unusual properties. The polyamide resins specifically disclosed in said patent have relatively high viscosities and accordingly present certain problems in handling. For example, the polyamide resins described specifically in said patent have viscosities in the range of 500 to 1,000 poises. In certain applications as, for example, in electrical embedment and casting applications, it is imperative that the resinous material be bubble-free when cured. With materials of high viscosity it is difficult to effect adequate mixing without incorporation of air. With a less viscous material it is possible to avoid bubble inclusion in the castings. The novel polyamide resin of the present invention is of materially reduced viscosity and accordingly eliminates this problem. Low viscosity is also of importance in laminating fibre glass, in the form of cloth, roving or mat since the lower viscosity aids in the penetration of the resin into the fibers. This is especially true in hand lay-up where little or no pressure is used in impregnating the glass fiber.

A further advantage of the present invention is that the novel polyamide reacts more readily with the epoxy resin by reason of the larger number of amine groups available for reaction and the smaller molecular size of the polyamide. At the same time, the present invention retains the advantages referred to in the above patent, namely, the reduced toxicity and volatility of the polyamines heretofore employed and the retention of the improved impact resistance flexibility and machining properties found in the compositions of the patent referred to.

It is, therefore, an object of the present invention to provide a novel polyamide resin composition and a process of producing the same, the polyamide resin being characterized by a reduced molecular weight and an increased content of free amino groups.

The polyamide composition of the present invention is the reaction product of a preliminary polyamide with a further quantity of polyamine. The preliminary polyamides are in general those derived from polymeric fat acids and either aliphatic or aromatic polyamines. These polyamines may be represented by the following formula:

$$H_2N(RNH)_nH$$

in which R is an aliphatic hydrocarbon group and $n$ is from 2–5. Of particular importance are the polyamines in which R is an alkylene group containing from 2–4 carbon atoms. Typical of the polyamines which may be employed are diethylene triamine, triethylene tetramine, tetraethylene pentamine, 3,3-imino-bis-propylamine, and the like. These polyamines are reacted with polymeric fat acids as described in the patents referred to above  in such proportions that the polyamide thus obtained will have an amine number of from 80–230. For this purpose, amine number is defined as the number of milligrams of potassium hydroxide equivalent to the free amine groups in one gram of the resin. The reaction is carried out under any suitable conditions such as, for example, a temperature of 200° C. for approximately 4 hours during the latter part of which the reaction mixture is maintained under a vacuum for the purpose of removing water of reaction.

The polyamide thus obtained is similar to the polyamides disclosed in some of the examples of the above referred to Renfrew et al. patent. This polyamide is then reacted with a further quantity of a polyamine of the type described to effect a partial amide interchange with the polyamide. For this purpose a quantity of polyamine is employed which will give an amine number in the resultant modified polyamide of from approximately 230–300, preferably from 250–300. Frequently this will require approximately 9 parts by weight of the original polyamide resin and approximately 1 part by weight of additional polyamine.

The amide interchange reaction is carried on for a limited period of time to produce a product of reduced viscosity, generally, a Brookfield viscosity within the range of 80–120 poises at 40° C. Frequently this degree of reaction can be obtained in approximately 2 hours at 200° C. The particular reaction conditions are not critical and it will be apparent that other reaction conditions may be employed which produce a product having a different viscosity.

The product thus obtained is admirably suited for reaction with epoxy resins. These epoxy resins are complex polymeric reaction products of polyhydric phenols with polyfunctional halohydrins such as epichlorohydrin and glycerol dichlorhydrins. Usually the difunctional chlorhydrin is used in proportions in excess of that equivalent to the polyhydric phenol and less than that which is twice the equivalent amount. The reaction is carried out in the presence of caustic alkali which is usually employed in at least the quantity necessary to combine with the halogen liberated from the halohydrin, and usually is employed in excess. The products obtained may contain terminal epoxy groups, or terminal epoxy groups and terminal primary hydroxyl groups. In the complex reaction mixture the terminal epoxy groups are generally in excess of the terminal primary hydroxyl groups. Typical polyhydric phenols include resorcinol, and various bisphenols resulting from the condensation of phenol with aldehydes and ketones such as formaldehyde, acetaldehyde, acetone, methyl ethyl ketone, and the like. Resins of this type are disclosed in Greenlee Patent 2,585,115 and these resins are useful in the present invention.

The following examples will serve to illustrate the invention.

*Example 1*

A polyamide resin was prepared from polymerized soybean oil acids and triethylene tetramine. The polyamide had an amine number of 225 and a Brookfield viscosity at 40° C. of 500 poises. Nine parts by weight of this polyamide resin were reacted with 1 part by weight of tetraethylene pentamine, for 2 hours at 200° C. The product had an amine number of 300 and a Brookfield viscosity at 40° C. of 85 poises. The physical mixture of the original polyamide resin and the tetraethylene pentamine before reaction had a viscosity 15–35 poises higher than the final reaction product.

Three parts by weight of the polyamide reaction product above were reacted at room temperature with 4 parts by weight of an epoxy resin derived from bisphenol A and epichlorhydrin. The total mass of the reaction mixture was 150 grams. The temperature rose from the initial 30° C. to a maximum of 115° C. by reason of exothermic reaction. The usable pot life of the blend was 90 minutes before the viscosity became too great to permit pouring of the resin. The cured mass had a Barcol hardness at 25° C. of 45–50 after 24 hours. It was then further cured for 3 hours at 110° C. after which the Barcol hardness at 25° C. was 60–65.

*Example 2*

Three parts of the polyamide resin of Example 1 were blended with 7 parts of another epoxy resin derived from bisphenol A and epichlorhydrin to yield a total mass of 150 grams. The temperature rose from an initial 28° C. to a maximum of 66° C. The usable pot life of the blend was 100 minutes. The cured mass had a Barcol hardness of 30–35 which was increased to 50–55 by 3 hours additional curing at 110° C.

The amounts of the polyamine to be reacted with the preliminary polyamide resin may readily be determined by the physical and chemical properties desired in the reaction product. Where higher reactivity is desired to effect room temperature cure or to speed up heat curing, the amount of the polyamine to be reacted with the preliminary polyamide can, of course, be increased. The increase in the amount of the polyamine also decreases the viscosity of the resulting polymer. It will be apparent, of course, that by unduly increasing the quantity of the polyamine the size of the polymer may be reduced to the point at which it no longer possesses the desired advantages. Within the viscosity range referred to above, however, it has been found that the polyamide possesses sufficient fluidity, sufficient reactivity and sufficient polymer size to attain the advantages described.

It will also be apparent that the polyamides may be derived solely from polymeric fat acids or from mixtures thereof with other dibasic acids such as sebacic, adipic, terephthalic or their esters, anhydrides or other amide forming derivatives.

We claim as our invention:

1. Process of producing a polyamide resin product which comprises reacting at an elevated temperature polymeric fat acids and a polyamine having the formula $H_2N(RNH)_nH$ in which R is an alkylene group of from 2–4 carbon atoms and $n$ is from 2–5, the reaction being conducted under vacuum near the end of the reaction period, to produce a preliminary polyamide resin having an amine number of from 80–230, further reacting said preliminary polyamide resin with a polyamine having the above formula to produce a polyamide resin having an amine number within the range of 230–300 and a Brookfield viscosity at 40° C. of 80–100.

2. Process of producing a polyamide resin product which comprises reacting triethylene tetramine with polymeric fat acids in the proportions to yield a preliminary polyamide resin having an amine number of from 80–230, said reaction being conducted under vacuum near the end of the reaction period, adding tetraethylene pentamine thereto and reacting the resin further to produce a polyamide resin having an amine number within the range of 230–300 and a Brookfield viscosity at 40° C. of 80–120.

References Cited in the file of this patent

UNITED STATES PATENTS

| | | |
|---|---|---|
| 2,450,940 | Cowan et al. | Oct. 12, 1948 |
| 2,550,682 | Falkenburg et al. | May 1, 1951 |
| 2,663,649 | Winkler | Dec. 22, 1953 |
| 2,767,089 | Renfrew et al. | Oct. 16, 1956 |

OTHER REFERENCES

Smith et al.: J.A.C.S., 60, 1938, pp. 657–8.

Falkenburg et al.: Oil and Soap, vol. 22, 1945, pp. 143–48.

Beste et al.: Journal of Polymer Science, vol. VIII, No. 4, 1952, pp. 395–407.

Chem. Abstr., vol. 49, 10893c, citing "Doklady Akad. Nauk.," S.S.S.R., 97, 675–8 (1954).

Tremain: Adhesives and Resins, 3, No. 3, 57–9 (March 1955).